United States Patent

[11] 3,610,443

| [72] | Inventors | Jon Berge<br>Brumunddal;<br>Sigmund Rypdal, Honefoss, both of Norway |
|---|---|---|
| [21] | Appl. No. | 871,438 |
| [22] | Filed | Sept. 10, 1969 |
| [45] | Patented | Oct. 5, 1971 |
| [73] | Assignee | Skogsagarnas Industri Aktiebolag<br>Hultsfred, Sweden<br>Continuation-in-part of application Ser. No.<br>664,149, Aug. 29, 1967, now abandoned. |

[54] MACHINE FOR THE AUTOMATIC STACKING OF BOARDS AND OTHER TIMBER
3 Claims, 8 Drawing Figs.

[52] U.S. Cl. .................................................. 214/6 DK
[51] Int. Cl. ........................................................ B65g 57/10
[50] Field of Search ............................................ 214/6 P, 6 DK, 6 H, 6 M

[56] References Cited
UNITED STATES PATENTS

| 2,397,720 | 4/1946 | Beane | 214/6 K |
| 2,915,202 | 12/1959 | Aitken | 214/6 K |
| 3,122,241 | 2/1964 | Lawson, Sr. | 214/6 K |
| 3,312,327 | 4/1967 | Clapp et al. | 214/6 K X |
| 3,393,812 | 7/1968 | Mayo et al. | 214/6 K |
| 3,422,968 | 1/1969 | Martin | 214/6 K |
| 3,437,215 | 4/1969 | Lunden | 214/6 K |
| 3,446,368 | 5/1969 | Nelson | 214/6 K |
| 3,477,201 | 11/1969 | Small | 214/6 H X |
| 3,483,065 | 12/1969 | O'Brien | 214/6 K X |
| 3,520,422 | 7/1970 | Bruce et al. | 214/6 P |

Primary Examiner—Gerald M. Forlenza
Assistant Examiner—Robert J. Spar
Attorney—Albert M. Parker ABSTRACT: A machine for stacking boards or other elongated articles having an automatically actuated displacement mechanism which removes the articles from a position to which they have been advanced by a conveyor and stacks them in layers. The displacement mechanism is moved by a pivoting linkage to lift and carry successive layers from a table to the stack periodically upon actuation by a feeler device which is mounted adjacent to the table.

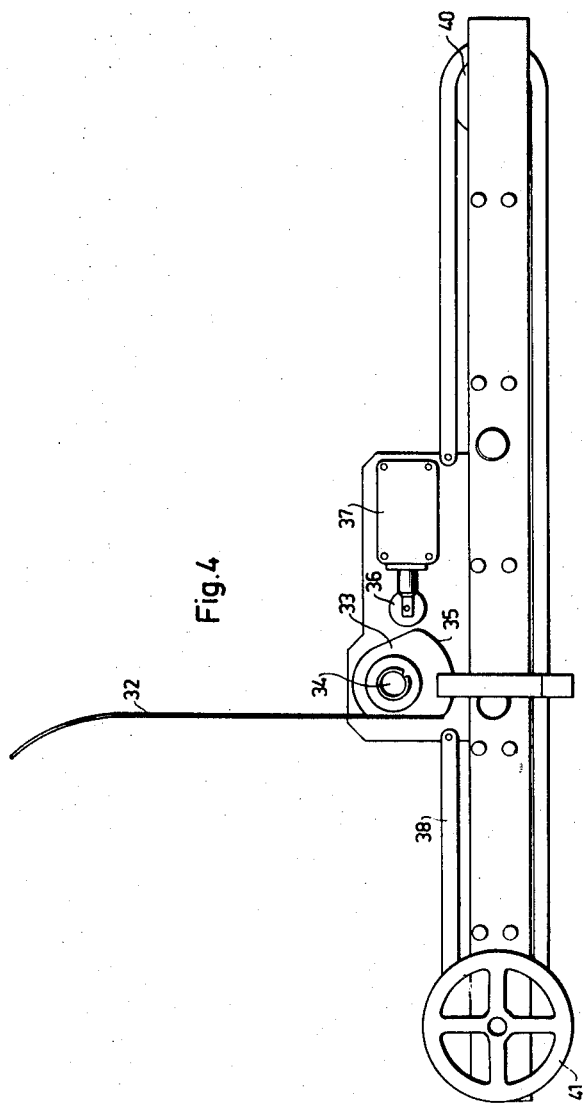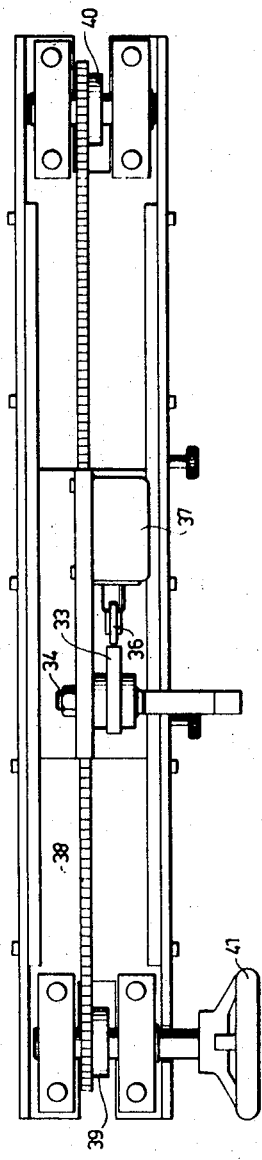
Fig.4
Fig.5

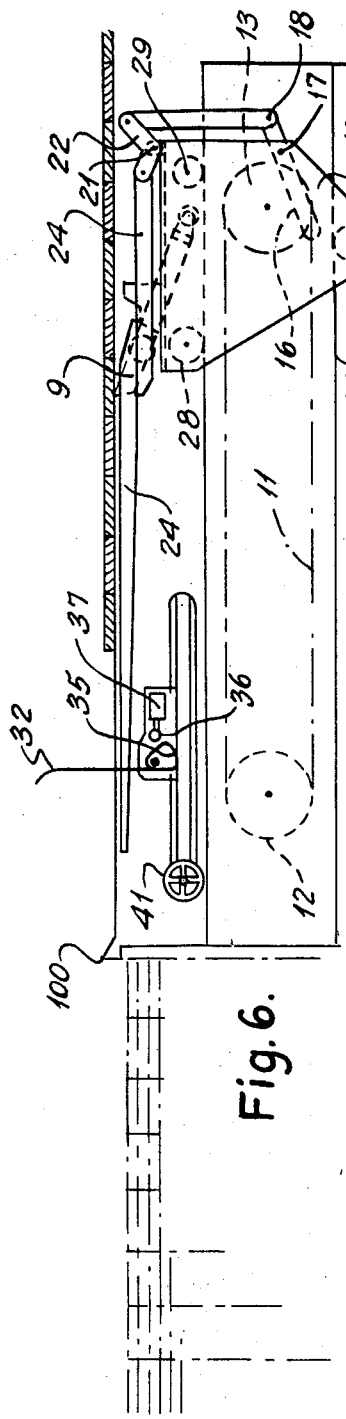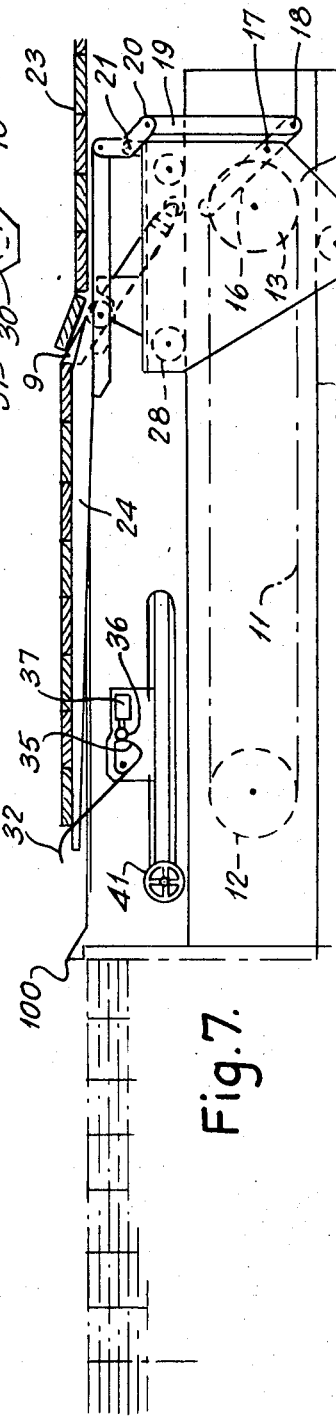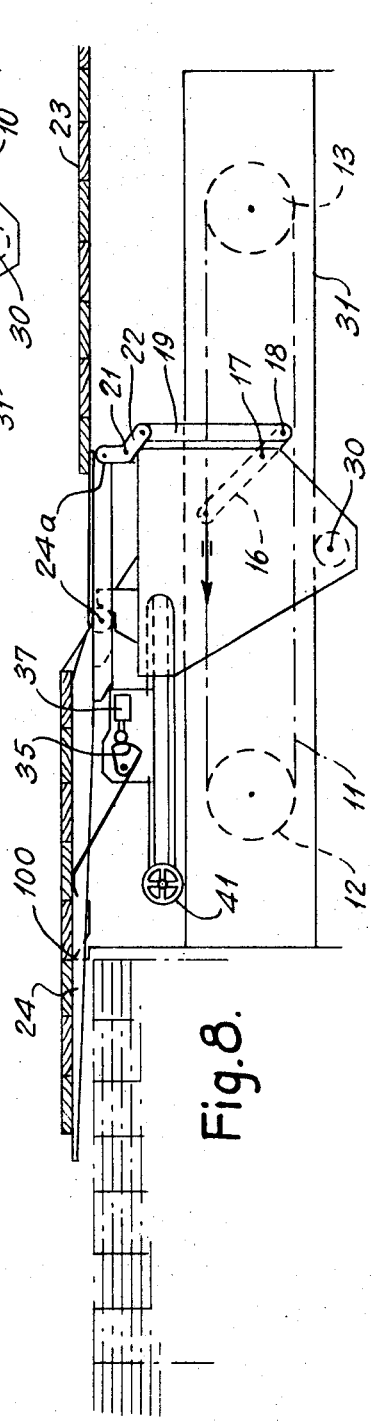

MACHINE FOR THE AUTOMATIC STACKING OF BOARDS AND OTHER TIMBER

The application is a continuation-in-part of our application Ser. No. 664,149 filed Aug. 29, 1967 and entitled "A MACHINE FOR THE AUTOMATIC STACKING OF BOARDS AND OTHER TIMBER," now abandoned.

SUMMARY OF THE INVENTION

This invention concerns a machine for the automatic stacking of boards and other timber into a heap or bundle. However, the machine can also be used for stacking other elongated articles, such as pipes, bars or the like. Apparatus constructed in accordance with the present invention is particularly intended for use in the rapid stacking of timber which is delivered at great speed from a fast operating processing machine such as a plane. The speed of expulsion of lumber from such processing machines is often so great that it has not heretofore been possible in practice to arrange the wood delivered by the processing machine into a stack or bundle, a step which is necessary in order to efficiently convey the timber in the course of preparation or to a storage place. The machine hereinafter described is capable of achieving this object in such manner that only a small staff is required and ready adjustability of the machine to handle various sizes of timber is facilitated.

According to the invention a machine for stacking bundles of board, timber and other articles has a conveyor member for advancing the articles disposed transversely thereon to a table, a stacking station for collecting the articles in a layer of a number of adjacent articles and a moveable displacement mechanism mounted on the table for displacing the layer of articles from the table to the stacking station. A feeling member mounted adjacent the table senses the presence of a completed layer of articles on the table, and impulse means operated by the feeling member actuates the displacement mechanism to pick up the entire layer as a unit to carry it along and to deposit it at the stacking station. Return means is provided for returning the displacement mechanism to its starting position adjacent the table.

The displacement mechanism is provided with at least one pivotable arm which is displaceable in the path of the articles, or with stops constructed as drivers to cooperate with the articles by opening up a passage for the articles conveyed on to the table until a layer is completed, and then to act as drivers for the displacement of the layer to the stacking station. At least one supporting arm is provided for lifting the layer of articles from the table and for carrying the layer to the stacking station during the displacement operation. A stationary frame member at the stacking station is arranged in the path of the arm so that, during the displacement operation, the supporting arm together with the layer of articles resting thereon will be raised above the height of the top layer most recently introduced into the stacking station. For this purpose a member having a surface inclined to the horizontal plane is positioned between the table and stacking station near the point of transfer to the stacking station so that the supporting arm or arms will ride up the incline, thus lifting the layer above the one last deposited for placement of the layer on top of the stack. The member having the inclined surface or some other suitable stop member may be located so as to prevent the layer introduced into the stacking station from being taken back from the station on the return movement of the arm or arms together with the displacement mechanism.

The displacement mechanism preferably has a carriage slideable along the table. The carriage includes a system of links which is connected at one end to the pivotable arm and at its other end to a drive chain of the carriage in order to effect a movement to the carriage concurrent with the movement of the chain about chain-driving wheels.

Lifting and lowering movements of the supporting arm as articles are transferred and the displacement mechanism returns to its starting position may be controlled by a cam formed in such manner that the carrier arm in its inoperative position is substantially relieved in the direction of forward movement. Alternatively the driving device for the displacement mechanism could be coupled to lifting and lowering means for the supporting arms.

The feeler member is preferably selectively adjustable to be positioned closer to or further away from the end of the table to cause displacement of articles of various sizes and of layers of various lengths.

A preferred embodiment of the invention will be described in detail by way of an illustrative embodiment of a machine for stacking boards with reference to the accompanying drawings in which like reference characters indicate like parts:

FIG. 4 is a side view of a feeler mechanism and

FIG. 5 is a top view of said feeler mechanism.

FIG. 6 is a side view of the machine similar to that of FIG. 1, with some parts omitted and some hidden parts shown in dashed lines.

FIG. 7 is a view similar to FIG. 6 showing the position of the machine at the end of formation of a layer of boards.

FIG. 8 is a view similar to FIGS. 6 and 7 showing the displacement of a layer of boards to a stacking station.

Figure 1:
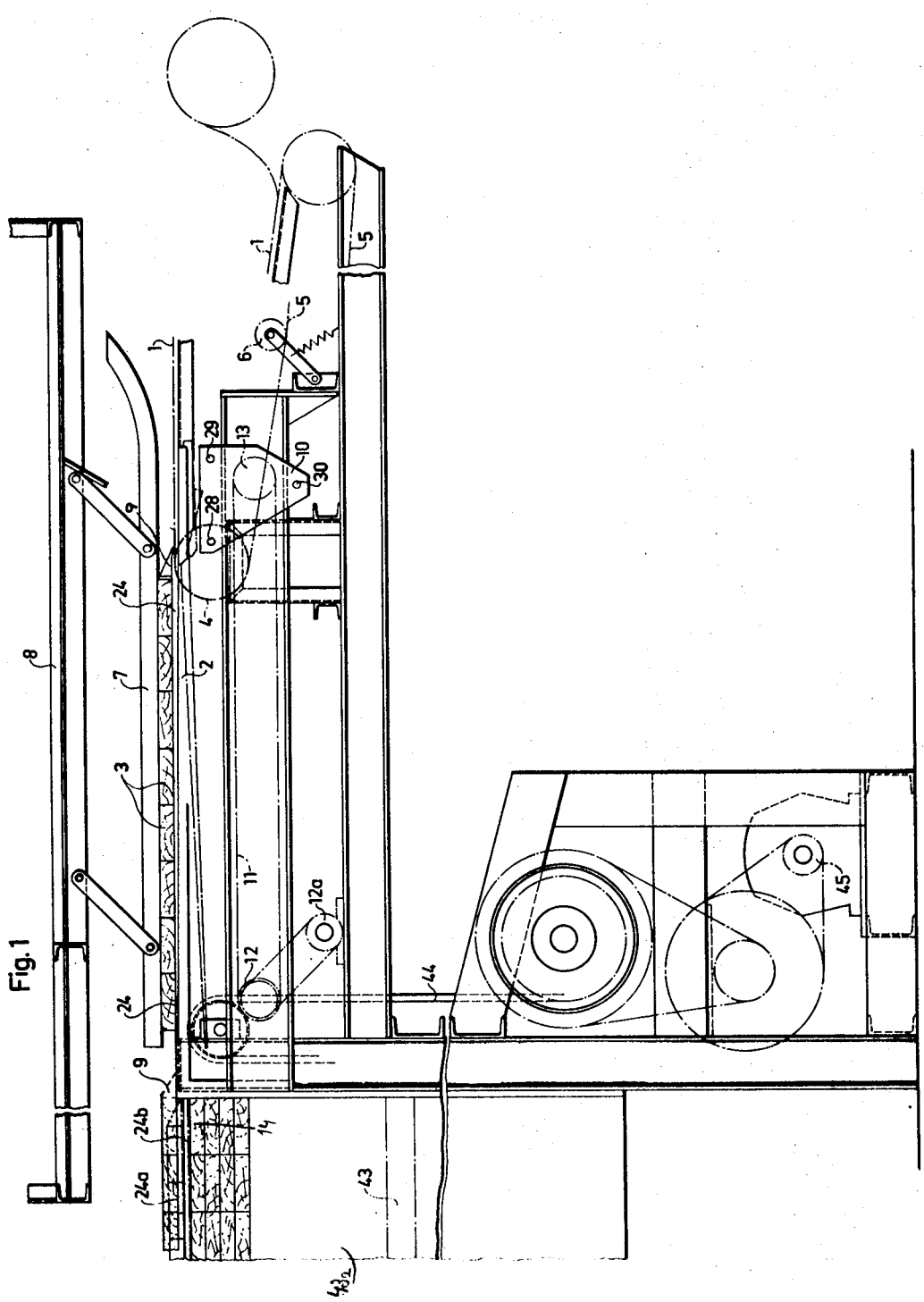
FIG. 1 is a perspective side view of a machine according to the present invention.
Figure 2:
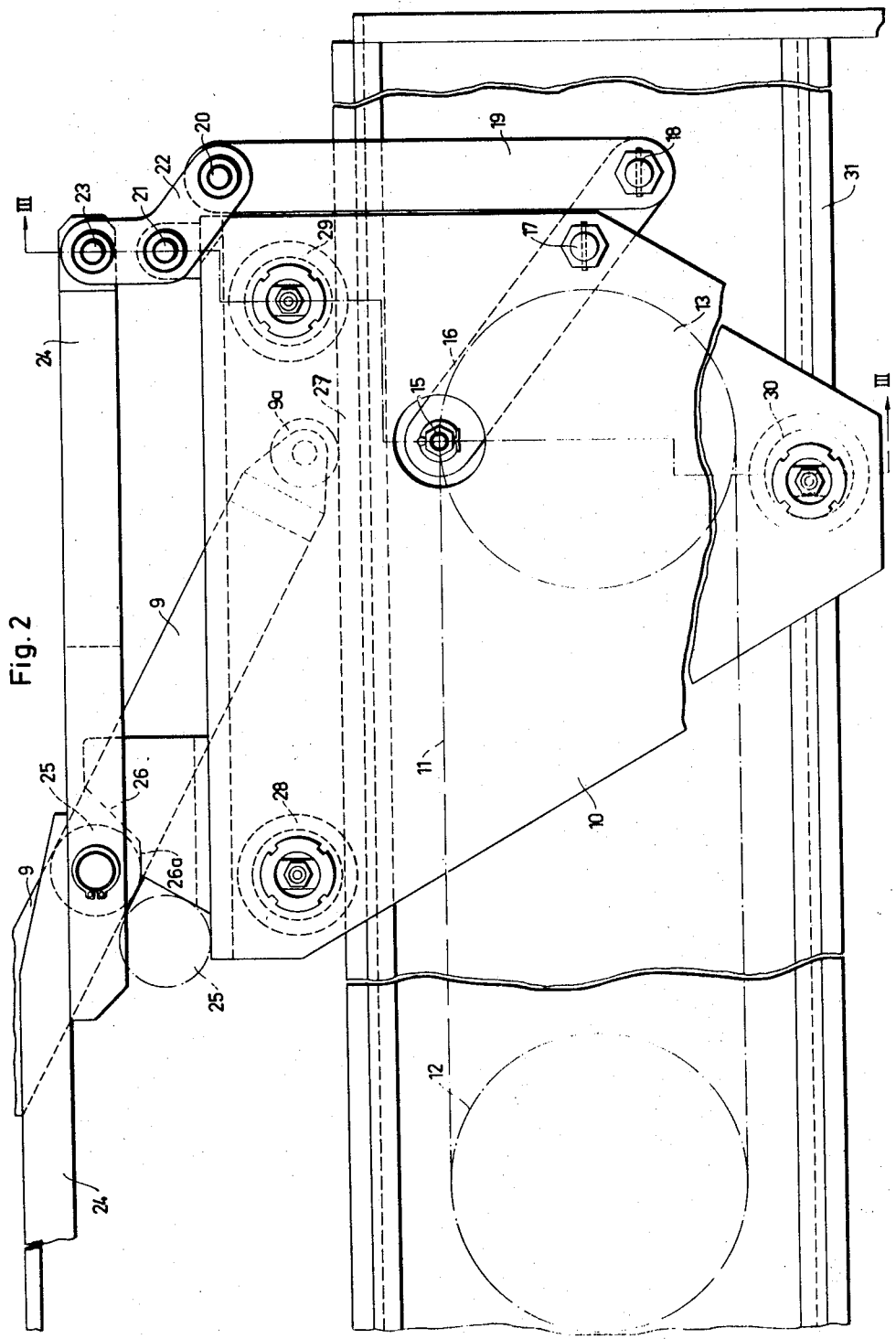
FIG. 2 is a side view of the displacement mechanism of the machine of the present invention.
Figure 3:
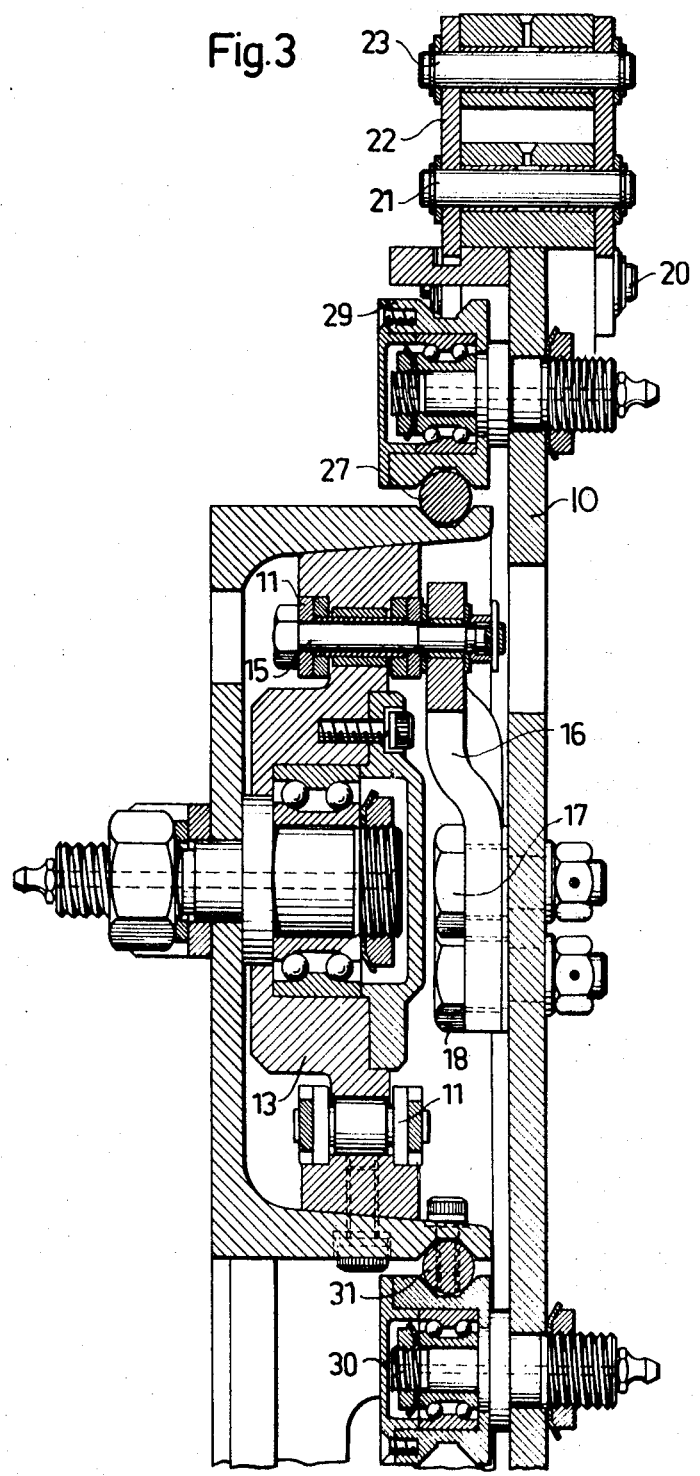
FIG. 3 is a vertical section along the line III—III of FIG. 2.

Referring now to FIG. 1, the stacking machine is shown to include a table 2 on to which boards 3 or like articles are fed in a single layer by a suitable infeed device such as a conveyor belt 1 indicated by broken lines. Each new supply of timber fed to the machine pushes forward the timber already pushed transversely on to the table 2 so that the layer is pushed forward in stages. In order to keep the timber in a neat arrangement, one or more spring or weight-loaded rails 7 rest on top of the wood. These rails are resiliently suspended from a beam construction 8. Each piece of timber also passes over a shoulder or arm 9 mounted at the front or infeed end of the table, which arm 9 is held below the path of movement of the timber in a lower position best shown in FIG. 6 as the wood is collected on the table, which arm however, under the effect of an impulse or signal from the remote end of the table, can be moved into an upper position as best shown in FIG. 7. The impulse occurs and the arm moves when a desired number of pieces of timber have been fed on to the table. The arm 9 is resiliently mounted so that it is pressed down under the weight of each piece of timber, as timber is fed on to the table but when the said actuating impulse is received and the arm moves to its extending or pushing position as shown in FIG. 7, it is held firmly in place by means of a roller 9a riding on a guide rail 27. The arm 9 as shown in FIG. 2 is pivotally connected to and carried by a carriage or slide 10 which is displaceable along the table by means of a spatial displacement mechanism. This displacement mechanism consists of a chain 11 guided over two guide pulleys 12, 13 one at each end of the table. As best shown in FIGS. 2 and 3 the carriage 10 is connected to the chain 11 by a link 16. Link 16 has one of its ends pivotally secured to the chain 11 by means of a bolt 15 journaled in the link and extending through the chain as shown in FIG. 3. The other end of link 16 is pivotally connected to a vertical link 19 by a pin 18. A pin 17 pivotally securing the link 16 to the carriage 10 near the pin 18, acts as a fulcrum. The carriage 10 is suspended at three points by rollers 28, 29, 30 which are arranged in the manner of a triangle and the upper two of which run on a rounded positioned guide rail 27 beneath them while the lower roller 30 runs on a rounded guide rail 31 positioned above it. This arrangement ensures steady and reliable movement of the carriage 10.

The link 16 is pivotably secured at its upper end to the chain 11 by bolt 15 and is able to follow the movement of the chain 11 around the two chain wheels 12, 13 for which reason the link 16 works more or less as a crank arm which is rotatable about the bolt 17 to move the vertical link 19 up and down. The upper end of the link 19 is pivotably connected by means of a pin 20 to one end of a toggle link 22 which is rotatable about a pin 21 journaled in the carriage 10. The toggle link 22 is pivotally connected at its other end to an approximately horizontal arm 24 by a pin 23. The arm 24 has an upwardly offset extension which extends forwardly along the table 2 and serves as a supporting base for the timber 3 which rests on the arm 24 as the layer of boards is conveyed to stacking station 43. The position shown in FIG. 2 is the operative position of the displacement mechanism, the arm 9 being in its upper position.

The arm 9 is also pivotally connected to the generally horizontal arm 24 to move with arm 24, and at their point of connection there is a roller 25, best seen in FIG. 2. The roller 25 is positioned to travel on a cam or block having an upwardly and rearwardly inclined surface, for raising the arm 24 and at the same time moving arm 9 to its upper position when the roller rolls rearwardly up the cam.

The machine should preferably be provided with two or more carriages 10, sets of chain wheels 12,12, chains 11, joints 16,19,22, and arms 24 and 9 and so on. However, the present description refers to only one unit.

Having described the structure of the stacking machine in detail, the mode of operation of the machine will now be set forth, with particular reference to FIGS. 6-8 showing the operative positions of the apparatus at various stages of the displacement and stacking operation. FIG. 6 shows the apparatus in its position as a new layer of boards advances on to the table 2. In FIG. 7 the last board of a layer has just passed the end of arm 9, and in the showing of FIG. 8 the layer is being lifted and moved to the stacking station. The arm 24 then assumes the position 24a and arm 9 is in the position shown in broken lines in FIG. 1. In this position the carriage 10 has reached the rear end of the table 2 and the movement of bolt 15 around the circumference of wheel 12 produces a downward displacement of arm 24. During the withdrawal of arm 24 from the stacking station 43 the timber layer 3 is held in position against return movement by an upstanding stationary member 100 mounted on the frame as the arm 24 slips out from beneath the layer.

As the machine operates the elements cooperate as follows. The upper end of the link 16 is pivotably secured to the chain 11 by means of the bolt 15 and is thus able to follow the movement of the chain around the two chain wheels 12 and 13 when the carriage reaches the limits of its travel. Thus the link 16 acts as a crank or lever arm, rotating about the bolt 17. The link 16 is pivotally connected at its lower end to the vertical link 19 by pin 18, so that during a movement of the chain 11 upwardly around the circumference of chain wheel 13, the bolt 15, following the wheel 13, lifts up one end of link 16, which pivots about its connection at 17, pulling down the link 19. The downward movement of link 19 tips toggle link 22 about its connection to the carriage by bolt 21. Since the end of toggle link 22 is pivotally attached to the arm 24, the arm 24 is pulled upward, causing the roller 25 attached to arm 24 to move up an inclined path on the cam to the position 26a of FIG. 2. Thus arm 24 is elevated and raises the layer of timber. Simultaneously the upper end of the arm 9 is brought into engagement with the trailing edge of the last piece of the timber layer, since arm 9 is also pivotally connected to move with arm 24. During the subsequent movement of chain 11 pulling the carriage 10 along the table as the bolt 15 rides on the upper run of the chain 11, arm 9 moves with arm 24 supporting the layer of timber to stacking station 43. The carriage 10 is now drawn back by the lower run of the chain 11. The carriage 10 is returned to the starting position and the bolt 15 moves to the rear position and is held there by the arms 24 and 9 in the lowered position.

During the transfer of the layer of timber 3 to the stacking station 43a, the conveyor belt 1 has meanwhile supplied fresh timber to the table 2. This timber then rests on special fixed rails or ledges between which the arm 24 extends for raising the timber with the above-described lifting movement so that it rests on the arm 24. With the rising motion of the arm 24 the roller 25 has risen to the shoulder 26a. The arm 9 rests on guide rails 27 by means of a roller 9a. The arm is pressed down by the fresh supply of timber.

The stack of timber in the stacking station 43a rests on a base 43 which is formed as a hoist and, with each new layer of timber, is lowered one stage by means of a lead-lifting machine (not shown) by a motor 45. After the stack has been built up to the desired height, it is removed by suitable means and a new stack begun.

The impulse triggering the movement of the chain 11 may, for example, be obtained from the mechanism shown in FIGS. 4 and 5, comprising a feeler 32 arranged in the path of the timber at the remote end of the table and mounted on a member 33 rotatable about an axis 34, said member being balanced so that it tends to retain the feeler 32 in an upright position. When the front piece of timber 3 has reached the position at the rear end of the table on which the feeler 32 is disposed, the feeler 32 and the member 33 are turned so that a cam surface 35 on this member cooperates with a roller 36 on an actuating mechanism 37 which in turn starts the driving motor 11a of the chain 11, with this actuation, by an electric, hydraulic, or pneumatic impulse, for example.

The described feeling mechanism may be adjustable in the direction of movement of the timber layer 3 in order to effect an adjustment according to the desired width of the timber and/or the layer of timber by positioning the feeler 32 to intercept the leading edge of a layer of selected width. For this purpose the mechanism 32-37 is mounted on a carriage which can be set in the desired position at the end of the table 2 by means of a chain 38 disposed over chain wheels 39,40, and wheel 41.

It will be obvious to those skilled in this art that the practice of this invention lends itself readily to various modifications. The specific machine described is only disclosed by way of illustration and various changes can be made in the scope of the invention.

We claim:

1. A machine for automatically stacking boards, timber and other elongated articles comprising: conveyor means for advancing articles disposed thereon to a table with their longer dimension transverse to the direction of conveyor movement; said table including a support for collecting said articles into successive layers, each layer being composed of a number of adjacent articles; a displacement mechanism mounted along the table for displacing each successive layer of articles from said table to a stacking station, said displacement mechanism comprising at least one supporting arm adapted to move successive layers of articles to the stacking station as units and a carriage displaceable along said table provided with a linkage connected at one end to said arm and at its other end to a chain for lifting said arm together with a layer of articles resting on the arm during the movement of the arm to said stacking station, lowering the arm on the upper layer in the stacking station, depositing a layer of articles at the stacking station and returning the arm in its lowered position to support the next layer of articles, said chain running around two chain wheels, one wheel being mounted at each end of the table, said carriage being connected to said chain by means of a bolt arranged to move said carriage along said table as the bolt travels with the chain along the table and around said chain wheels, and said linkage including a link pivotally connected to said carriage by means of a bolt, said link having one end connected to said chain, a vertical linking member pivotally connected to the other end of said link, and a toggle link rotatably secured to a pin mounted on said carriage and pivotally connected at one end to said vertical linking member, the other end of said toggle link being pivotally connected to said arm; a feeler member mounted adjacent the table and adapted to cooperate with each layer in its collected condition; impulse means operable by said feeler member for actuating said displacement mechanism when the collection of a layer is completed to displace each successive layer as a unit and to deposit it upon a previously deposited layer in said stacking station.

2. A machine according to claim 1 in which a stationary stop member mounted adjacent to the stacking station prevents the return of a layer of articles deposited at the station when the arm is returned in its lowered position.

3. A machine as in claim 1 including holddown means mounted above the table for keeping the articles in an orderly arrangement to form said successive layers.